March 17, 1964  A. DELISLE  3,124,857
SPIGOT GROOVE FORMER FOR CONCRETE PIPE
Filed Dec. 4, 1961  2 Sheets-Sheet 1
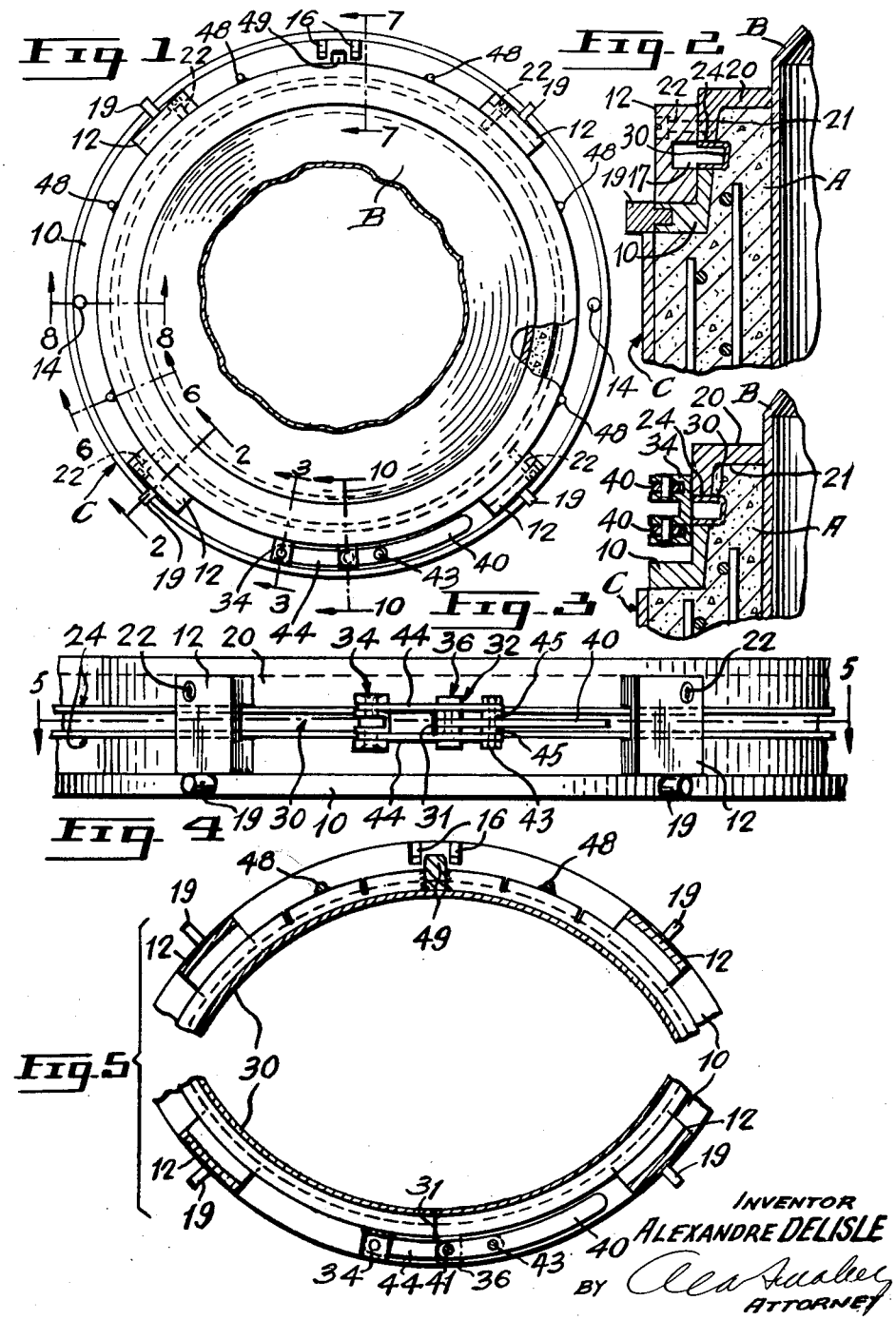
INVENTOR
ALEXANDRE DELISLE
BY
ATTORNEY March 17, 1964 A. DELISLE 3,124,857
SPIGOT GROOVE FORMER FOR CONCRETE PIPE
Filed Dec. 4, 1961 2 Sheets-Sheet 2
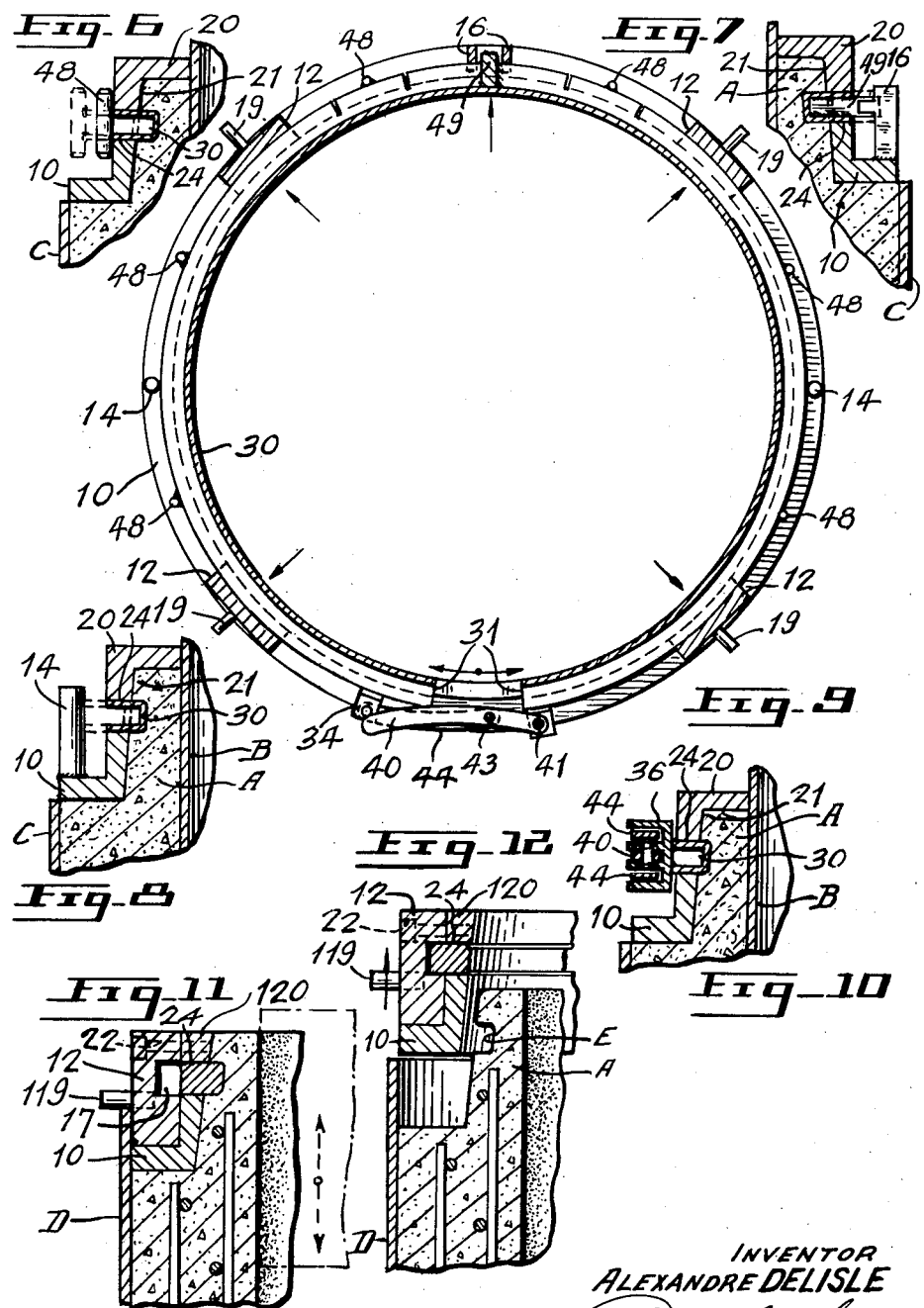
INVENTOR
ALEXANDRE DELISLE
BY
ATTORNEY

United States Patent Office 3,124,857
Patented Mar. 17, 1964

3,124,857
SPIGOT GROOVE FORMER FOR CONCRETE PIPE
Alexandre Delisle, Ville St. Laurent, Quebec, Canada, assignor to Canada Iron Foundries, Limited, Montreal, Quebec, Canada
Filed Dec. 4, 1961, Ser. No. 156,752
5 Claims. (Cl. 25—39)

The present invention relates to improvements in the manufacture of concrete pipe and more particularly to improvements in the preparing of concrete pipe sections for interconnection.

It is common practice to make concrete pipe sections as having a bell end and a spigot end and utilizing a resilient packing ring or sealing gasket between the bell and spigot ends of interconnected pipe sections. In order to provide a retaining means for such a sealing ring or gasket it is also common practice to provide an inwardly extending annular groove in the spigot end of the pipe sections.

The concrete pipe of this type is produced by several moulding methods, for example, by centrifugal spinning, or by the more common casting in vertical moulds which are vibrated to compact the concrete or casting in fixed vertical moulds with the compacting performed by a moving core. In the latter procedures it is also common practice to utilize some form of a separate mould or former to make the ring receiving groove or channel in the spigot end of the pipe. The pipes are usually moulded bell end down and spigot end up and these auxiliary moulds or spigot groove formers are generally placed on top of the usual mould. There is a common problem encountered in this spigot groove forming in that in order to provide a smooth unbroken ring receiving groove in the finished pipe the groove forming member must necessarily be capable of being freed from the compacted partially set pipe without damage to the groove it has formed and the adjacent pipe body. In order to overcome this problem various expedients have been proposed, for example a resilient forming ring has been used which can be stretched radially after the moulding and slipped off the pipe while in stretched condition.

Other expedients are to make the forming ring in segments which are separated for removal, and to make the forming member as a spring type split ring which is initially sprung closed against the spigot for forming by an arrangement of screws or bolts and released to spring open for its removal.

The present invention aims to provide an improvement on these prior expedients by furnishing a spigot groove forming arrangement which can be easily and quickly mounted on and removed from standard vertical pipe moulding arrangements as a unit and without the necessity of adjustments to multiple screws or bolts or expansion of a resilient ring.

This is accomplished by providing a spigot groove former which consists basically of three (3) main parts namely, an L-shaped bottom ring supporting a plurality of supporting brackets, stoppers and a locating bracket; a removable top ring which is either rectangular or L-shaped, depending on the type of moulding process as will be described, and which is secured to the bottom ring through the supporting brackets to provide an annular space in which will slide the third element, namely a retractible middle ring The retractible middle ring which can be rectangular, or preferably a U-shaped channel to maintain flexibility is split with the open ends connected by a toggle clamp arrangement. A plurality of stoppers and a locating lug are provided on the retractible ring which, in combination with the bottom and top rings make the retractible ring self-centering when closed by the toggle clamp. The interior faces of the bottom and top rings are machined so that they accurately form the spigot and offer support to the concrete when the middle ring is retracted.

In use, the present groove former is supported directly on the upper end of the pipe mould over the partially compacted pipe and the forming ring reduced in diameter by the toggle clamp to form the desired groove. When the concrete is fully compacted and set to a degree permitting removal of the mould, the toggle clamp is opened forcing the retractible ring outwards until it contacts the stoppers provided on the bottom ring thus clearing the groove formed and permitting removal of the former as a unit.

Having thus generally described the nature of the invention, particular reference will be made to the accompanying dragings, showing by way of illustration preferred embodiments thereof, and in which;

FIGURE 1 is a view in top plan of a spigot groove forming assembly in accordance with the invention as it would appear mounted on a vertical pipe mould in accordance with a standard vibro-cast process.

FIGURE 2 is a sectional view of FIGURE 1 along the line 2—2 to illustrate the construction more clearly.

FIGURE 3 is a sectional view of FIGURE 1 along the line 3—3 to illustrate the construction more clearly.

FIGURE 4 is a view in side elevation of a segment of the construction shown in FIGURE 1 showing the retractible ring toggle clamp.

FIGURE 5 is a cross sectional view of segmented portions of the construction shown in FIGURE 1 as viewed along the line 5—5 of FIGURE 4 to illustrate the retractible ring construction more clearly at sections embodying the locating lug and toggle clamp.

FIGURE 6 is a sectional view of FIGURE 1 along the line 6—6.

FIGURE 7 is a sectional view of FIGURE 1 along the line 7—7.

FIGURE 8 is a sectional view of FIGURE 1 along the line 8—8.

FIGURE 9 is a sectional view of the construction shown in FIGURE 1 as viewed along the line 5—5 of FIGURE 4 with the toggle clamp in released position expanding the ring to the full diameter for removal.

FIGURE 10 is a sectional view of FIGURE 1 along the line 10—10.

FIGURE 11 is a sectional view corresponding to FIGURE 2 to show the alternative top ring suitable for use with a fixed exterior mould and a movable core (packer head machine) in an alternative moulding process (Zeidler).

FIGURE 12 is a sectional view correspoding to FIGURE 11 showing the alternative construction of FIGURE 11 as it would appear with the retractible ring opened and the groove forming unit of the invention being cleared from the spigot end.

With particular reference to FIGURES 1, 4 and 5 of the drawings a spigot groove forming arrangement in accordance with the invention consists essentially of the following elements: an L-shaped bottom ring 10 on which there is mounted, in circumferentially spaced relationship, a plurality of brackets 12, stop pins 14, and a pair of spaced apart stop and guide plates 16; a removable top ring 20 is secured to the brackets 12 in spaced relationship from the bottom ring 10 by suitable cap screws 22 so as to provide an annular space 24 therebetween through which a retractible ring 30 can slidably move. The top ring 20, as shown in FIGURES 1 through 10, is substantially L-shaped so as to provide a moulding surface 21 for the terminal end of the pipe spigot "A" which contacts the inner core "B" of the mould. In the alternate construction as shown in FIGURES 11 and 12 the top ring 120 is substantially rectangular as shown to suit the different moulding process, in this case embodying the use of a movable core.

The retractible middle ring 30 can be made, as shown, as a U-shaped channel to maintain flexibility and this is split as indicated at 31 with the open ends interconnected by a toggle assembly 32. Alternatively it can be made of a solid rectangular bar. Attachment fittings 34, 36 are secured to the respective ends of the ring 30 to serve as anchorage and pivotal points for the toggle linkage. This toggle linkage consists of a main toggle lever 40 pivotally connected as indicated at 41 to the fitting 36 with toggle links 44 extending from and being pivotally connected to the fitting 34 and to the toggle lever 40 as indicated at 43. Suitable spacing washers 45 are provided between the ends of the links 44 and the lever 40 to maintain the lever 40 in alignment with its central connection 41 with the fitting 36.

The retractible middle ring 30 is provided with a plurality of stops 48 which abut against the exterior surfaces of the bottom 10 and top rings 20 to keep the ring in the desired circular outline when clamped in position and in addition the ring is also provided with an outstanding locating lug 49 which is diametrically opposed to the toggle clamp assembly and which fits between the bottom ring guide plates 16, as shown most clearly in FIGURES 1 and 9. It will be noted that in order to provide for the full expansion of the ring 30, controlled by the bottom ring stop pins 14, the brackets 12 are notched inwardly to provide ring guiding recesses 17. With this arrangement, the retractible ring 30 is substantially self-centering when closed or expanded by the toggle clamp assembly. The interior faces of the bottom ring 10 and top rings 20 and 120 are machined to the desired angle and conformation so that they accurately form the spigot end of the pipe and offer full support to the concrete when the middle ring is retracted.

When the present spigot groove former is utilized with a vertical mould "C" in a vibra-cast process, with the spigot end up and the bell end down, as shown in FIGURES 1 through 10, the assembly is centered on the core "B" by the inner face of the L-shaped top ring 20, and supported on the top of the mould "C" by pins or lugs 19 extending from the bottom ring 10. When the present spigot groove former is utilized with a vertical mould in a packer head casting process it is centered within and supported at the desired height on the exterior mould "D" by radial pins or lugs 119 secured to the brackets 12, at the required height from the bottom ring 10, as shown in FIGURES 11 and 12. In either case, it will be understood by reference to the preceding description and accompanying drawings, that it is a relatively simple operation to apply the assembly to the existing mould and by operating the toggle arrangement, retracting the ring to form the desired spigot groove "E." When the casting process is completed and the concrete sufficiently set to permit removal of the mould it is an equally simple operation to open the toggle clamp and extend the ring to its position flush with the exterior surfaces of upper and lower rings permitting removal.

The spigot groove former arrangement, as described and illustrated can be made to suit spigot ended pipes from 4" dia. to 96" diameter the only variation being in the relative dimensions of the elements described.

I claim:

1. A spigot groove former for moulding a seal receiving groove in the spigot end of an interconnectable concrete pipe having opposed spigot and bell ends, comprising, a base ring of continuous circular outline having an interior diameter corresponding to the exterior dimensions of said pipe spigot end and being provided with a plurality of supporting brackets extending upwardly therefrom in circumferentially spaced relationship, a top ring of continuous circular outline having an inner diameter substantially equal to that of said base ring being mounted on said supporting brackets with the lower surface of said top ring spaced from the upper surface of said base ring to provide therebetween a continuous annular recess, a retractible forming ring of split circular outline slidably mounted in said annular recess with its free ends connected by a toggle clamp assembly, said retractible ring by said toggle clamp connection having an adjustable inner diameter between a closed condition where it is equal to the maximum depth of the groove to be formed and an open condition where it is at least equal to the inner diameter of the portions of said base and top rings bordering said annular recess, and cooperating stop and guide means mounted on said base ring and retractible ring and adapted to maintain said retractible ring in aligned and concentric relationship relative to said base and top rings.

2. A spigot groove former as claimed in claim 1, wherein said base ring is substantially L-shaped in cross section with the base of the L extending outwardly and forming the lower surface of said base ring, the said top ring also being of a substantially L-shaped form in cross section with the leg of the L extending inwardly and forming said top ring upper surface, the inner surfaces of said top and bottom rings defining the outer top and side contours of said pipe spigot end being shaped to conform with the desired contours of said pipe spigot end.

3. A spigot groove former as claimed in claim 1, wherein said base ring is substantially L-shaped in cross section with the base of the L extending outwardly and forming the lower surface of said base ring, the said top ring being substantially rectangular in cross section and forming a substantial continuation of the leg of said base ring L-shaped section, the inner surfaces of said top and bottom rings inner surfaces being shaped to conform with the desired side contours of said pipe spigot end.

4. A spigot groove former as claimed in claim 1, wherein said retractible ring is of substantially U-shaped channel form in cross section with the open side of said U facing towards said top and base rings.

5. A spigot groove former as claimed in claim 1, wherein said retractible ring is of substantially rectangular form in cross section.

References Cited in the file of this patent

UNITED STATES PATENTS

| | | |
|---|---|---|
| 1,576,127 | Austin | Mar. 9, 1926 |
| 2,178,015 | Brunetti | Oct. 31, 1939 |